United States Patent [19]

Fretz, Jr.

[11] Patent Number: 5,064,712

[45] Date of Patent: * Nov. 12, 1991

[54] LAMINATED LENS STRUCTURE

[75] Inventor: E. Robert Fretz, Jr., Corning, N.Y.

[73] Assignee: Corning Incorporated, Corning, N.Y.

[ * ] Notice: The portion of the term of this patent subsequent to Dec. 27, 2005 has been disclaimed.

[21] Appl. No.: 325,880

[22] Filed: Mar. 20, 1989

[51] Int. Cl.$^5$ .................... B32B 27/38; G02C 7/10
[52] U.S. Cl. .................... 428/212; 428/213; 428/215; 428/415; 428/417; 428/428; 428/429; 428/473.5; 428/414; 351/163; 351/166; 351/177

[58] Field of Search .................... 351/163, 166, 167; 428/156, 174, 410, 412, 413, 414, 415, 417, 426, 428, 429, 473.5, 480, 913, 213, 215, 216, 212 I

[56] References Cited

U.S. PATENT DOCUMENTS

| | | | |
|---|---|---|---|
| 2,705,223 | 3/1955 | Renfrew et al. | |
| 3,341,399 | 9/1967 | Hazdra et al. | 428/437 |
| 3,391,053 | 7/1968 | Kolb | 428/419 |
| 4,230,769 | 10/1980 | Goossens | 428/414 |
| 4,487,805 | 12/1984 | Sellstrom | 428/413 |
| 4,679,918 | 7/1987 | Ace | 351/166 |
| 4,728,384 | 3/1988 | Goel | 428/414 |
| 4,735,830 | 4/1988 | Oezelli et al. | 428/428 |
| 4,793,703 | 12/1988 | Fretz | 351/166 |
| 4,883,548 | 11/1989 | Onoki | 351/166 |

Primary Examiner—Patrick J. Ryan
Assistant Examiner—Donald J. Loney
Attorney, Agent, or Firm—Clinton S. Janes, Jr.; Milton M. Peterson

[57] ABSTRACT

There is disclosed an improvement of the three layer laminated lens structure of U.S. Pat. No. 4,793,703 whereby the adhesive inerlayer is more tightly bonded to the outer plastic and glass layers by reactive groups on the surfaces of each layer. This controls a problem of delayed delamination.

20 Claims, No Drawings

LAMINATED LENS STRUCTURE

FIELD OF THE INVENTION

This invention relates to ophthalmic lens structures comprising laminated layers of glass and plastic bonded together.

BACKGROUND OF THE INVENTION

All-glass, ophthalmic lenses have relatively high densities which may result in sufficient weight to cause wearer discomfort. Organic plastic lenses, having relatively low densities, and hence less weight, have become popular. However, these are generally less scratch-resistant than glass lenses.

In recent years, photochromic lenses, that is, reversibly darkening glass lenses, have become popular. As yet, however, organic photochromic materials have not been developed that are resistant to fatigue, that is, loss of the reversibly darkening characteristic with use. Therefore, a strong desire has existed to develop a lighter weight, ophthalmic lens having the potential for photochromic behavior.

My U.S. Pat. No. 4,793,703 describes a three-layer composite lens. The structure is composed of an inorganic glass layer, which may be photochromic, a layer of a rigid organic plastic, and an interlayer of a flexible, organic adhesive that can be cured in the vicinity of room temperature. Characteristically, the linear coefficient of expansion of the glass is about $60-120 \times 10^{-7}/°C$, and that of the rigid plastic layer is about $200-700 \times 10^{-7}/°C$.

This construction alleviated severe stress conditions, and consequent delamination, that had been encountered with higher expansion plastics, such as CR-39 commonly used in organic lenses. It also enhanced optical clarity, particularly under high humidity conditions.

Nevertheless, attempts to develop a commercial product demonstrated a need for further improving the bond strength between the layers. A particularly annoying problem was the tendency for a laminated lens to undergo delayed delamination after exposure to high humidity or boiling water. Such delamination of a lens occurs upon standing for a matter of days after testing positive in the aqueous environment to determine resistance to environmental conditions.

PURPOSES OF THE INVENTION

A basic purpose is to provide an improved laminated lens structure of the type described in my -703 patent.

A particular purpose is to provide such a lens structure having superior resistance to temperature cycling and to moisture penetration.

Another particular purpose is to correct the problem of delayed delamination.

A further purpose is to provide a three-layer lens structure having improved bonding between the layers.

SUMMARY OF THE INVENTION

My invention is a three component laminated lens structure exhibiting optical quality transmission which does not delaminate after repeated thermal cyclings over the temperature range $-40°$ to $+80°$ C. and does not delaminate or demonstrate significant haze after exposure to high humidities for extended periods of time, said lens comprising:

(a) a thin, inorganic glass layer having a linear coefficient of thermal expansion within the range of about $60-120 \times 10^{-7}/°C$. and having reactive groups on its surface bonded to (b) a rigid, organic plastic layer having a linear coefficient of thermal expansion within the range of $200-700 \times 10^{-7}/°C$. and having reactive acid groups on its surface through (c) a flexible, epoxy adhesive layer that can be cured in the vicinity of room temperature, and that contains groups reactive with those on the surfaces of the glass and the rigid plastic layer;

whereby improved bonding of the layers to one another, and consequent improved temperature and moisture resistance, are obtained.

In preferred embodiments, the glass layer may be 0.5-1.5 mm. thick, and the reactive groups on its surface may be amino functional silane groups. The rigid plastic layer may be epoxy or an imide modified acrylic and the reactive groups on its surface may be carboxylic acid groups. The adhesive interlayer may be 0.01 to 0.02" thick and have in its formulation epoxy groups in excess of that demanded by stoichiometry.

PRIOR ART

In addition to my patent described above, the best references known to me are disclosed in that patent, the contents of which are incorporated herein by reference.

The curing of mixtures of polyamide resins and complex epoxides is described, for example, in U.S. Pat. No. 2,705,223 (Renfrew et al.).

Priming of glass surfaces with silanes, prior to laminating with either polyvinyl butyral or epoxy resin, is disclosed in U.S. Pat. No. 3,341,399 (Hazdra et al.).

Use of an amino-functional silane to improve the delamination strength of an epoxy-glass composite is disclosed in U.S. Pat. No. 3,391,053 (Kolb).

Use of a silane coupling agent to improve flexural strength in a composite material of synthetic mica and an epoxy resin is disclosed in U.S. Pat. No. 4,480,060 (Hoda et al.).

A photochromic glass/plastic laminated lens comprising a buried layer of photochromic glass, surface layers of optically clear plastic, and intermediate adhesive bonding layers is described in U.S. Pat. No. 4,268,134 (Gulati et al.).

GENERAL DESCRIPTION OF THE INVENTION

The present invention is an improvement over that constituting the subject matter of my -703 patent. The basic construction in each product is a three-layer laminated lens in which an outer glass layer and an outer rigid plastic layer are bonded together by a flexible, plastic adhesive interlayer.

A primary provision in my patented lens structure is a closer relationship between the coefficients of thermal expansion of the rigid glass and plastic outer layers. Thus, the prescribed coefficient range for the glass is $60-120 \times 10^{-7}/°C$., and that for the plastic is $200-700 \times 10^{-7}/°C$. This relationship alleviated severe stress conditions that developed when higher expansion coefficient plastics were used. Accordingly, it is adopted as a requirement for the present lens structures as well.

The crux of the present invention is provision of chemically reactive organic groups on the bonding surfaces of the layers to provide greater bonding strength in the laminated lens.

The glass layer, because of greater scratch resistance, is usually the front layer, but this is not a necessary condition. It may be formed from any desired glass of optical quality. However, the invention is of particular value in providing lighter weight, photochromic lenses. The thickness of the glass layer is preferably in the range of 0.5 to 1.5 mm., and a thickness of about 1.1 mm. has been employed in my studies.

In accordance with the present invention, the glass layer is treated to provide reactive coupling agents on the glass surface. Particularly effective coupling agents are amino functional silane groups wherein the silane attaches to the glass and the amine is available as a reactive member.

The rigid epoxy layer may be an anhydride cured epoxy; for example, a mixture of cycloaliphatic and aromatic epoxy resins cured by cycloaliphatic anhydrides such as hexahydrophthalic anhydride. Such formulations may have a ratio of carboxylic groups to epoxy groups on the order of 1.7/1, thereby providing an excess of acid groups on the epoxy layer surface for bonding purposes.

Another available material for the rigid plastic layer is an imide modified acrylic resin. Such resins are available from the Rohm and Haas company under the registered trademark KAMAX. They may be formulated to provide an abundance of free carboxylic acid groups on the surface for bonding. One such resin that has been particularly useful is available under the code T151.

Chemically, these resins are poly methacrylates where the side groups are converted to methyl imides, in particular N-methyl-dimethyl glutarimides. Side groups, in typical acrylic thermoplastics, consist of ester or acid moities. Different grades of materials are made by varying the amount of imide groups present, and the amount of acid and ester groups remaining.

The optical transmission of these resins is listed at 90% with 2% haze as tested by ASTM D-1003. The refractive index varies from 1.53 to 1.54 depending on the amount of imide groups present. Thus, the imide groups increase the refractive index of standard acrylics from about 1.49 to higher levels. Abbe number was found to be 48 which is good for use in ophthalmics.

The flexible epoxy interlayer is preferably very thin, normally on the order of 0.01 to 0.02 inches in thickness. For present purposes, it is formulated with an excess of epoxy groups above that required by stoichiometry. This excess is available for chemical bonding to the reactive groups on the rigid glass and plastic outer layers.

A particularly effective group of flexible epoxy adhesives may be prepared from aromatic epoxy resins. These resins may be cured with polyoxypropylene diamines to produce stable formulations containing 50 to 75% of the theoretical amount of amino groups based on the equivalents of epoxide groups present. With lesser amounts of amino groups, the adhesive tended to be tacky and weak. With larger amounts, the material became brittle and not sufficiently flexible. Within the indicated range, the cured resins were fairly strong and flexible, and had excellent adhesion to the glass and rigid plastic layers.

The polyoxypropylene diamines employed as curing agents are available under the registered mark Jeffamines from Texaco Chemical Co. Curing of the resins may be accelerated by additions of polyphenolic materials, and especially catechol. Gel times of about four hours were obtained at about 55° C.

Four tests were used to determine resistance of the laminates to environmental conditions. These are: thermal cycling from −40° C. to +80° C. (2 hour cycles for 30 days), humid aging at 50° C./98% relative humidity for 30 days, boil test for 6 hours, and a 6 hour oven bake test at 100° C. These tests are designed to be accelerated tests which can be used to predict the long term behavior of the laminates under conditions of high humidity and reasonable extremes of use temperatures.

Another requirement for the adhesive is that it cure near room temperature. This is needed to eliminate stress in the laminate which could arise from curing at a high temperature and subsequent cooling to use temperature.

Epoxy resins are typically produced by a condensation reaction between a rigid aromatic diepoxide (termed the A-side of the condensation product) and an aromatic or aliphatic diamine or anhydride hardener (termed the B-side). Aliphatic amine hardeners are preferred for present purposes, since they are reactive with epoxides at room temperature. The diepoxide most frequently used in epoxy resins is typically based on bisphenol-A.

These resins may be flexibilized by three basic methods. In one method, longer chain aliphatic groups, having greater freedom of rotation, are substituted for all or part of the shorter aliphatic groups in either the A-side or B-side of the resin. Also, longer chain aliphatic amines are used as curing agents. In a second method, reactive diluents, typically aliphatic or aromatic monoepoxides, such as butyl glycidyl ether, are substituted for part of the diepoxide resin. A third method involves using an excess of either epoxide or amine, that is, departing from the 1:1 stoichiometry, to reduce the amount of crosslinking.

A key element in arriving at the present inventive combination arose in the course of investigating adhesive interlayers. Aliphatic and aromatic epoxy resins from a variety of sources were employed alone and in combinations. These in turn were cured with a number of curing agents from different sources. The diepoxide and the hardener were mixed on 1:1 proportions in accordance with commonly recommended practice. Several combinations were found which, when used in laminated lens structures, passed the several tests described above. However, invariably, delayed delamination started around the periphery of the lens on standing.

Surprisingly, one laminated lens did not undergo delayed delamination, after passing the humidity and 6-hour boil tests. This lens employed a flexible adhesive interlayer composed of a resin available from Emerson and Cuming under the designation Eccogel 1265. The epoxide and hardener components were mixed in the recommended 1:1 proportions and presumably provided a 1:1 stoichiometry as in previous mixtures. Accordingly, an extensive study of the components was undertaken seeking a reason for the difference in behavior. Measurement of the epoxy equivalent weight of the resin (A-side) revealed a value of 189 g./eq. The hardener (B-side) was also measured by titration of the primary amine groups with perchloric acid. An equivalent weight of 319 g./eq. was determined. Comparison of the equivalent weights shows that the 1265 formulation uses only 59% of the amount of amine groups necessary to give equivalent stoichiometry of epoxide and amine.

Examples of flexible epoxy adhesive formulations are set forth in TABLE I, together with relevant properties. "Tg" refers to transition temperature; "% Abs." refers to water absorbed in a 30 minute boil test; "R.I." is the refractive index; "Cure Time" is the time in hours required for a complete cure of the formulation as determined by establishment of a constant Tg.

In the formulations, the ratios are in parts by weight, and the designations have the following significances:

EG-1265A is a predominantly aromatic epoxy resin from Emerson and Cuming.
EG-1265B is a mixture of polyoxypropylene diamines from Emerson and Cuming.
DER-332 is an aromatic epoxy resin, and DER-732 an aliphatic epoxy resin, both available from Dow Chemical.
EC 8799 is an aliphatic amine curing agent from Interez, Inc.
ET 310 is a formulated flexible epoxy resin and hardener (A/B) from Epoxy Technology.
DY-023 is cresyl glycidyl ether from Ciba-Geigy.
DEN-431 is an epoxy novolak resin from Dow Chemical.
JD-400 and JD-2000 are polyoxypropylene diamine curing agents from Texaco Chemical Co.

TABLE I

| Adhesive | Formulation | Tg | % Abs. | R.I. | Cure Time (hours) |
|---|---|---|---|---|---|
| L | EG-1265A | 1.0 | −2 | 1.50 | 1.539 | 68 |
|   | EG-1265B | 1.0 | | | | |
| M | DER-332 | 2.5 | 2 | 1.28 | 1.523 | 160 |
|   | DER-732 | 2.5 | | | | |
|   | EC8799 | 1.15 | | | | |
|   | EG-1265B | 1.0 | | | | |
| N | ET-310A | 2.5 | −1 | 2.11 | 1.516 | 188 |
|   | ET-310B | 1.0 | | | | |
|   | DY-023 | 1.0 | | | | |
|   | EG-1265B | 1.58 | | | | |
| O | ET-310A | 2.5 | 9 | 2.18 | 1.517 | 167 |
|   | ET-310B | 1.38 | | | | |
|   | DY-023 | 1.0 | | | | |
|   | EG-1265B | 1.0 | | | | |
| P | ET-310A | 2.5 | 13 | 2.94 | 1.518 | 125 |
|   | ET-310B | 1.7 | | | | |
|   | DY-023 | 1.0 | | | | |
|   | EG-1265B | 0.5 | | | | |
| Q | EG-1265A | 4.0 | −2 | 1.40 | 1.540 | 48 |
|   | EG-1265B | 5.1 | | | | |
|   | DEN-431 | 1.0 | | | | |
| R | ET-310A | 5.0 | −3 | 2.32 | 1.517 | 141 |
|   | ET-310B | 1.40 | | | | |
|   | EG-1265B | 2.16 | | | | |
| S | ET-310A | 5.0 | 9 | 2.50 | | 200 |
|   | ET-310B | 1.84 | | | | |
|   | EG-1265B | 1.44 | | | | |
| T | ET-310A | 5.0 | −10 | 2.06 | | 200 |
|   | ET-310B | 0.92 | | | | |
|   | EG-1265B | 2.88 | | | | |
| U | EG-1365A | 1.0 | −4 | 1.53 | | 3 HR/ 100 C. |
|   | EG-1365B | 1.0 | | | | |
| V | EG-1265A | 4.5 | | 1.74 | | 48 |
|   | EG-1265B | 5.05 | | | | |
|   | DEN-431 | 0.5 | | | | |
| W | DER 332 | 12.75 | 0 | 1.48 | | 48 |
|   | JD-2000 | 7.40 | | | | |
|   | JD-400 | 3.7 | | | | |
|   | CATECHOL | 0.38 | | | | |
| X | DER-332 | 4.0 | 1 | 1.56 | | 48 |
|   | JD-2000 | 2.26 | | | | |
|   | JD-400 | 1.13 | | | | |
|   | CATECHOL | 0.15 | | | | |
|   | DEN 431 | 1.00 | | | | |
| Y | DER-332 | 4.0 | 7 | 1.18 | | 48 |
|   | JD-2000 | 2.90 | | | | |
|   | JD-400 | 1.45 | | | | |
|   | CATECHOL | 0.20 | | | | |
|   | DEN 431 | 1.0 | | | | |
| Z | DER-332 | 5.00 | 8 | 1.31 | | 48 |

TABLE I-continued

| Adhesive | Formulation | Tg | % Abs. | R.I. | Cure Time (hours) |
|---|---|---|---|---|---|
| | JD-2000 | 2.62 | | | |
| | JD-400 | 1.31 | | | |
| | CATECHOL | 0.20 | | | |

Adhesive formulations were initially weighed in glass vials and mixed with a spatula. They were cured in aluminum pans in an oven for the times specified, and also given a postcure for 2 hours at 100° C. to insure complete cure. Cure times and Tg were determined using an IMASS Autovibron equipped for low temperature operation. Tg was determined as a function of cure time, and the cure time was defined as the time required for Tg to remain constant. For adhesives V through Z, Tg was also determined on a Perkin-Elmer DSC-4 Thermal Analysis System equipped with an FTS Systems low temperature intercooler. Water absorption was determined by weight pick-up on 7 gram samples cast in aluminum pans and boiled in deionized water for 30 minutes. Refractive index measurements were made using the BeckeLine method. Tensile measurements were made on an Instron tester.

Epoxy equivalent weights were determined by a procedure involving reaction of the epoxide groups with excess tetraethylammonium bromide and titration of liberated tetraethylammonium hydroxide with perchloric acid. The 0.01 N perchloric acid is standardized by titration of potassium acid phthalate.

Amino nitrogen content of the polyamines was determined by a titration of the amines to the crystal violet endpoint with 0.1N perchloric acid, standardized as described above.

When the adhesive formulations of TABLE I were incorporated into lens structures, it was found that the lens structures embodying formulations L, Q and V through Z did not undergo delayed delamination. These formulations typically do not have a balanced 1:1 stoichiometry of epoxide and amine. Lens structures embodying the remaining examples did have a balanced stoichiometry and did undergo delayed delamination.

The invention is further described with reference to assembling a laminated lens employing a molded photochromic glass lens and a molded rigid plastic lens. The latter is composed of a polymethacrylate having the ester or acid side groups replaced in part by methyl amides, in particular N-methyl-dimethyl glutarimides, but characterized as having substantial free acid groups on the surface.

The glass lens was thoroughly cleaned and rinsed, and then dipped in a 3% aqueous solution of 3-aminopropyl trimethoxy silane for 15 minutes. It was then heated for one hour at 1100° C., and finally rinsed and dried at 100° C. before use. The injection molded plastic lens was washed in heptane and dried at 100° C.

Adhesive solutions, as identified in TABLE I by the letters L through R, were mixed at room temperature. Each mixture was poured onto the concave surface of a glass lens. Ten mil thick spacers were provided on the plastic lens, either by applied spacer tape or by bumps molded in the plastic surface. The plastic lens was then slowly lowered onto the glass lens with the adhesive puddle being forced toward the edge. A weight was placed on the laminate assembly to hold the elements in place while the adhesive formulation in the laminate was cured in an oven at 55° C.

The semi-finished, laminated lenses were finished and edged in accordance with commercial practice. The finished lenses were then subjected to, and successfully passed, the four standard tests: the 6-hour boil test; the 6-hour oven bake at 100° C.; the 30-day humidity test at 50° C. and 98% relative humidity; and the −40° C. to +80° C., 2-hour temperature cycle test for 30 days.

I claim:

1. In a three component laminated lens structure exhibiting optical quality transmission which does not delaminate after repeated thermal cyclings over the temperature range −40° to +80° C. and does not delaminate or demonstrate significant haze after exposure to high humidities for extended periods of time, the improvement comprising:
   (a) a thin inorganic glass layer having a linear coefficient of thermal expansion within the range of about $60-120 \times 10^{-7}/°C$. and having reactive groups on its surface bonded to
   (b) a rigid organic plastic layer having a linear coefficient of thermal expansion within the range of $200-700 \times 10^{-7}/°C$. and having reactive groups on its surface through
   (c) a flexible epoxy adhesive layer that can be cured in the vicinity of room temperature and containing groups reactive with those on the surfaces of the glass and the rigid plastic layer;
whereby improved bonding of the layers to one another, and consequent improved temperature and moisture resistance, are obtained.

2. A lens structure in accordance with claim 1 wherein the glass layer is a photochromic glass.

3. A lens structure in accordance with claim 1 wherein the thickness of the glass layer is in the range of 0.5 to 1.5 mm.

4. A lens structure in accordance with claim 3 wherein the thickness of the glass layer is about 1.1 mm.

5. A lens structure in accordance with claim 1 wherein the reactive groups on the glass surface are amino functional silane groups.

6. A lens structure in accordance with claim 1 wherein the rigid organic plastic layer is an anhydride-cured epoxy resin.

7. A lens structure in accordance with claim 6 wherein the anhydride-cured epoxy resin is a mixture of cycloaliphatic and aromatic epoxy resins cured with a cycloaliphatic anhydride.

8. A lens structure in accordance with claim 7 wherein the cycloaliphatic anhydride curing agent is hexahydrophthalic anhydride.

9. A lens structure in accordance with claim 1 wherein the rigid organic plastic layer is an imide-modified acrylic resin.

10. A lens structure in accordance with claim 1 wherein the rigid organic plastic layer is an anhydride cured epoxy resin or an imide-modified acrylic resin and the reactive groups on the surface of the rigid organic plastic layer are carboxylic acid groups.

11. A lens structure in accordance with claim 10 wherein the rigid organic plastic layer is an anhydride-cured epoxy resin and the carboxy groups are in a ration of about 1.7:1 to the epoxy groups.

12. A lens structure in accordance with claim 1 wherein the thickness of the flexible epoxy adhesive layer is in the range of 0.01 to 0.02 inches.

13. A lens structure in accordance with claim 1 wherein the flexible epoxy adhesive layer is a composite of an epoxy resin and an amine hardener and the epoxy groups are in excess of that required by epoxy-amine stoichiometry of the resin.

14. A lens structure in accordance with claim 1 wherein the flexible epoxy adhesive layer is an aromatic resin cured with a polyoxypropylene diamine.

15. A lens structure in accordance with claim 14 wherein the epoxy groups are in excess of the amine groups in the cured resin.

16. A lens structure in accordance with claim 15 wherein the amino equivalents are in the range of 50-75% of the amount required for a 1:1 ratio with epoxy equivalents.

17. A lens structure in accordance with claim 14 wherein the flexible adhesive layer contains a polyphenolic as an accelerator.

18. A lens structure in accordance with claim 17 wherein the polyphenolic is catechol.

19. In a three component laminated lens structure exhibiting optical quality transmission which does not delaminate after repeated thermal cyclings over the temperature range −40° to +80° C. and does not delaminate or demonstrate significant haze after exposure to high humidities for extended periods of time, said components being:
   (a) a thin inorganic glass layer having a linear coefficient of thermal expansion within the range of about $60-120 \times 10^{-7}/°C$. and being bonded to;
   (b) a rigid organic plastic layer having a linear coefficient of thermal expansion within the range of $200-700 \times 10^{-7}/°C$.; by
   (c) a flexible epoxy adhesive layer that can be cured in the vicinity of room temperature and that is intermediate the glass layer and the plastic layer;
   the improvement comprising chemically reactive organic groups on the bonding surfaces of each component layer, the organic groups on each surface being chemically reactive with the organic groups on the adjacent layer surface, whereby improved bonding of the layers to one another, and consequent improved temperature and moisture resistance, are obtained.

20. A lens structure in accordance with claim 1 wherein the reactive groups on the thin organic glass layer are amino functional silane groups, the reactive groups on the rigid organic plastic layer are carboxylic acid groups and the flexible epoxy adhesive layer has an excess of epoxy groups.

* * * * *

UNITED STATES PATENT AND TRADEMARK OFFICE
CERTIFICATE OF CORRECTION

PATENT NO. : 5,064,712
DATED : November 12, 1991
INVENTOR(S) : E. Robert Fretz, Jr.

It is certified that error appears in the above-identified patent and that said Letters Patent is hereby corrected as shown below:

Column 8, line 5, change "ration" to --ratio--.

Column 8, line 55, change "organic" to --inorganic--.

Signed and Sealed this

Fourteenth Day of September, 1993

Attest:

BRUCE LEHMAN

*Attesting Officer*     *Commissioner of Patents and Trademarks*